No. 644,869. Patented Mar. 6, 1900.
W. NEWELL.
WAVE POWER MOTOR.
(Application filed June 19, 1899.)
(No Model.) 2 Sheets—Sheet 1.
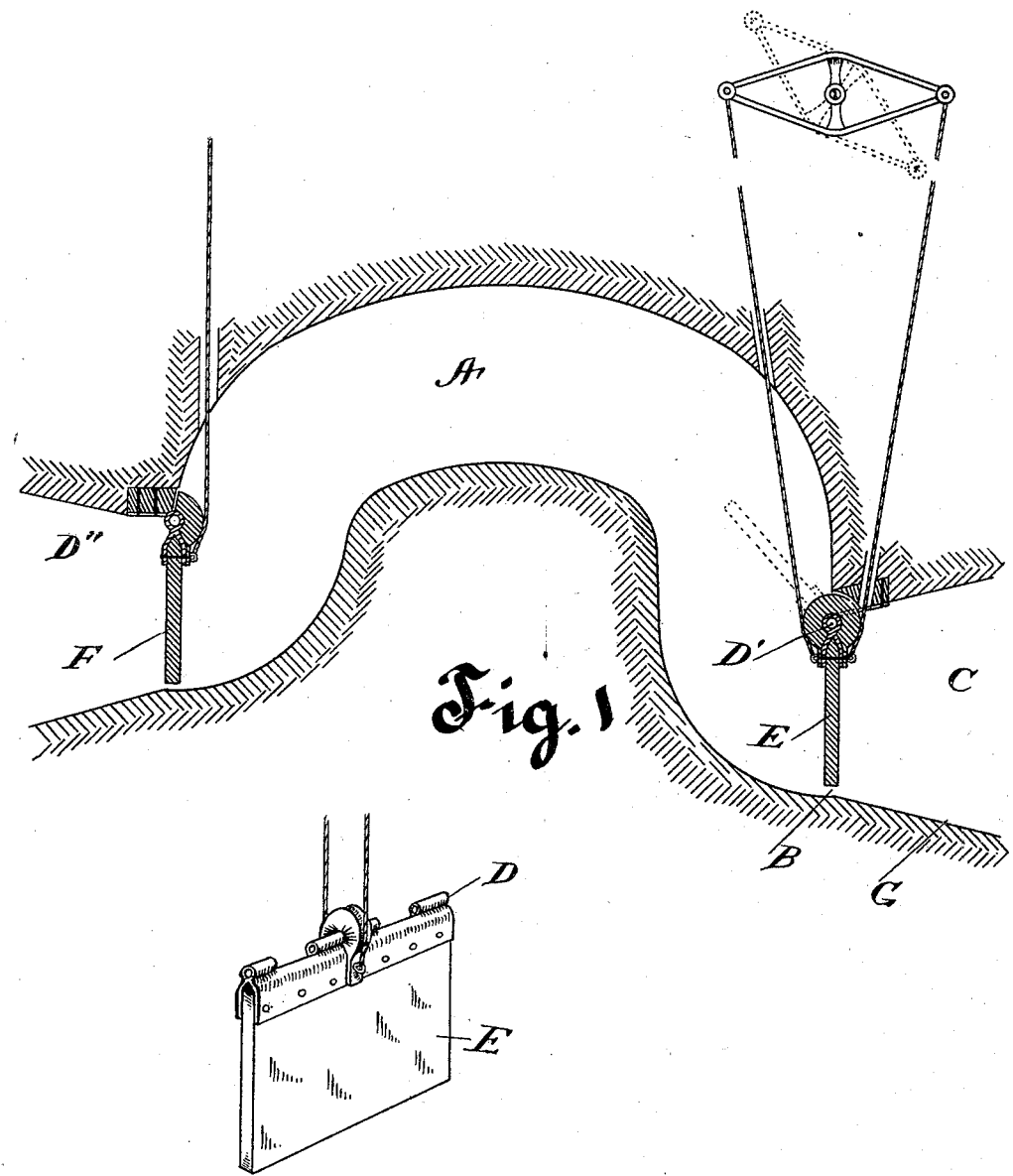
Witnesses
Geo. F. Kincaid
L. A. Goldbeck
Fig. 2  Inventor
William Newell
THE NORRIS PETERS CO., PHOTO-LITHO., WASHINGTON, D. C.

No. 644,869. Patented Mar. 6, 1900.
W. NEWELL.
WAVE POWER MOTOR.
(Application filed June 19, 1899.)
(No Model.) 2 Sheets—Sheet 2.
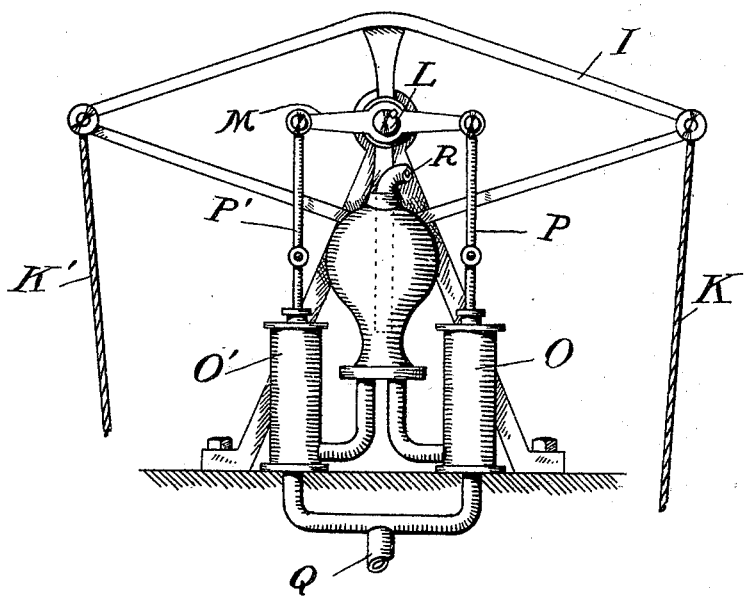
Fig. 3
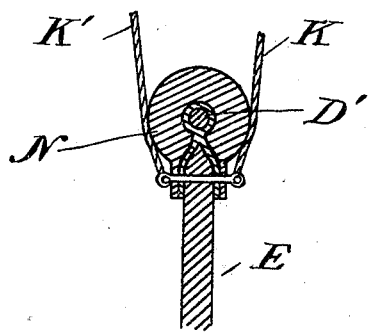
Witnesses
Geo. F. Kincaid
L. A. Goldbeck
Inventor
William Newell

UNITED STATES PATENT OFFICE.

WILLIAM NEWELL, OF SAN FRANCISCO, CALIFORNIA.

WAVE-POWER MOTOR.

SPECIFICATION forming part of Letters Patent No. 644,869, dated March 6, 1900.

Application filed June 19, 1899. Serial No. 721,173. (No model.)

*To all whom it may concern:*

Be it known that I, WILLIAM NEWELL, residing at San Francisco, State of California, have invented a Wave-Power Motor, of which the annexed is a specification.

My invention relates to an apparatus which is particularly designed to utilize the action of waves to force inward and outward two gates which are attached to a tunnel, thereby operating a pumping mechanism for the compression of air to be stored in tanks and also a pumping mechanism for raising water.

It consists of two pumps, each being connected by suitable mechanism to a gate, one of which gates is attached to the entrance and the other gate is attached to the end of a tunnel in such manner that when the gate at the entrance of the tunnel is pushed inward or outward by water it will actuate a pump and when the gate at the end of the tunnel is pushed outward by water it will actuate a pump.

Reference being had to the accompanying drawings, in which the invention is represented, Figure 1 is a vertical sectional view of my wave-motor. Fig. 2 is a perspective view of the gate E. Fig. 3 is an elevation of the pumping mechanism.

A, Fig. 1, is a tunnel of sufficient capacity to admit any amount of water which may be necessary. This tunnel may be excavated in the cliff bordering on the ocean or built on the shore where there is sufficient rise of the waves. One end of this tunnel A is connected at B with a canal C, whose sides diverge outwardly in a direction that will admit the waves to its expanded mouth. The waves are thereby concentrated at B and pass into the tunnel at the gate E. The mouth of the canal C is so situated that it will always be open for the ingress of waves. In places where the rise and fall of the tide is considerable two or more of these canals may be made to connect with the tunnel A, the lowermost of the canals being operative until the mouth is entirely submerged and the canal or canals above coming into action as soon as the tide has risen high enough to flow into them.

E and F are gates, which are hung by their upper sides to the top of the tunnel A at D' D''. The waves coming from the canal C will be thrown against the gate E, pushing it inward. The tunnel A is inclined upward from the gate E to about the center of the tunnel. It then declines from that point to the gate F in such manner that when the water rushes into the tunnel with sufficient force it will glide completely through and, passing outward, will be thrown against the gate F at the end of the tunnel, forcing this gate outward. If the water does not enter the tunnel with sufficient force to carry it through to the outer gate F, it will fall back down the incline against the gate E, pushing it outward. A conduit extends to the ocean from the tunnel A at the outer gate F, Fig. 1, which is sufficiently large to carry the water which passes through this gate.

Each of the canals may be provided with gates, which may be closed, and thereby prevent ingress of the water to the tunnel when necessary.

The floor G of the canal C is inclined to prevent its becoming obstructed by sand or other substances.

E, Fig. 2, represents one of the gates. It is pivotally attached at D to the tunnel A, substantially as described.

The chains K K', Fig. 3, are attached to the wheel N on the shaft D' and are also attached to the ends of the rocking arm I, to which is fastened the crank M, revolving on the shaft L. When the waves force the gate E inward and upward, it causes the wheel N to revolve, which works the rocking arm I and drives the piston-rods P P' of the pumps O O'.

The pipe Q is the inlet for the salt water, which is sucked up by the pumps O O', which are placed over the gate E. This pipe is extended down to the bottom of the tunnel A, Fig. 1, near the gate E.

R, Fig. 3, is the outlet-pipe for the water from the pumps O O'. This water may be forced to any place desired by extending this pipe.

What I claim as new, and desire to secure by Letters Patent, is—

1. In a motor the combination of a gate pivotally attached to the entrance of a tunnel, adapted to be pushed inward by the power of a wave flowing into a tunnel from a canal, thereby operating a pump in unison therewith.

2. In a motor the combination of a gate pivotally attached to a tunnel, adapted to be pushed outward by the power of a wave flowing outward from a tunnel against said gate, thereby operating a pump in unison therewith.

3. In a motor a tunnel whose floor is inclined upward from the entrance to about the center, and downward from that point to the end of the tunnel, it being adapted to admit a wave which passing through a gate hung at the entrance of the tunnel, can pass out of the tunnel through a gate hung at the end of the tunnel.

WILLIAM NEWELL.

Witnesses:
　THOMAS V. CATOR,
　E. C. CORDELL.